United States Patent [19]

Payne et al.

[11] Patent Number: 4,523,416
[45] Date of Patent: Jun. 18, 1985

[54] FLOORING SYSTEM WITH SERVICE TRUNKING PROVISION

[75] Inventors: Harold J. W. Payne; Ghislaine R. L. Payne, both of Handley, England

[73] Assignee: H. H. Robertson (U.K.) Limited, England

[21] Appl. No.: 495,293

[22] Filed: May 16, 1983

[30] Foreign Application Priority Data

May 15, 1982 [GB] United Kingdom ............... 8214225

[51] Int. Cl.³ .......................................... E04F 17/08
[52] U.S. Cl. .................................................. 52/221
[58] Field of Search ............... 52/220, 221; 174/48, 174/49

[56] References Cited

U.S. PATENT DOCUMENTS

| | | | |
|---|---|---|---|
| 3,721,051 | 3/1973 | Fork | 174/49 |
| 3,932,696 | 1/1976 | Fork et al. | 174/48 |
| 4,065,896 | 1/1978 | Penczak | 52/220 |

Primary Examiner—James L. Ridgill, Jr.
Attorney, Agent, or Firm—William A. Drucker

[57] ABSTRACT

Services segregation apparatus for a gap between corrugated sheeting (40) of flooring comprises at least one apertured divider (11) communicating separately with upwardly closed elements (17, 18) to each side. Endmost elements also communicate with sheeting channels. Services (45, 46) are segregated by the divider and then by passing under or between the elements without cross-overs relative to other segregated services. Three-way segregation is also described and universal side and division blanks.

20 Claims, 6 Drawing Figures

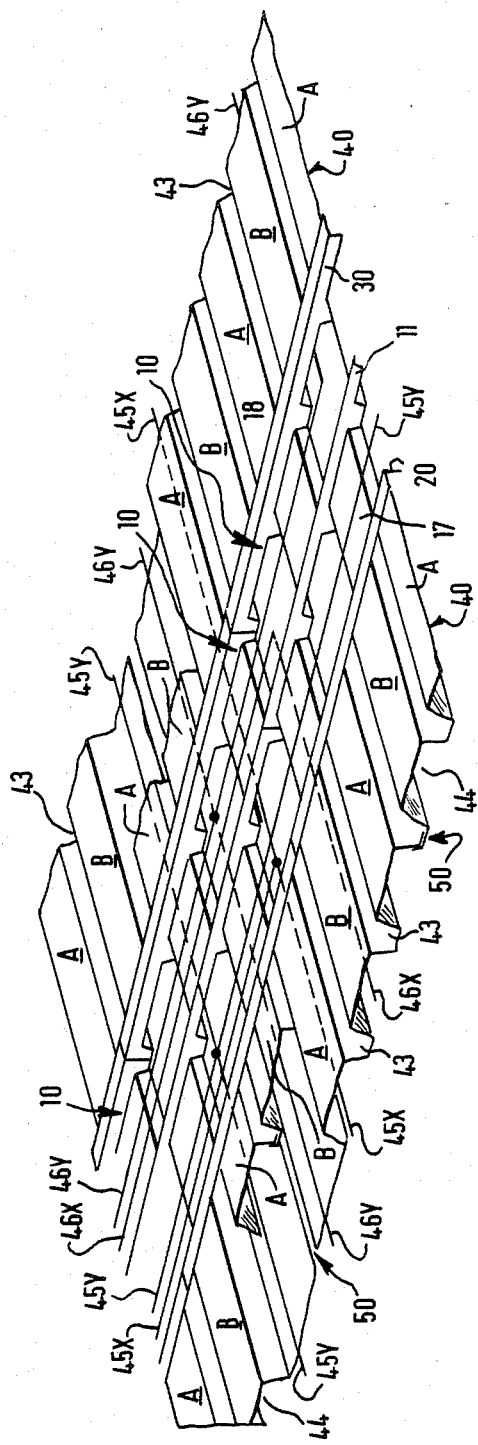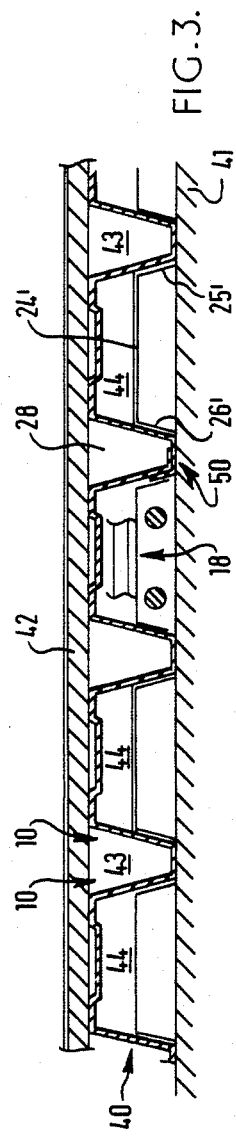

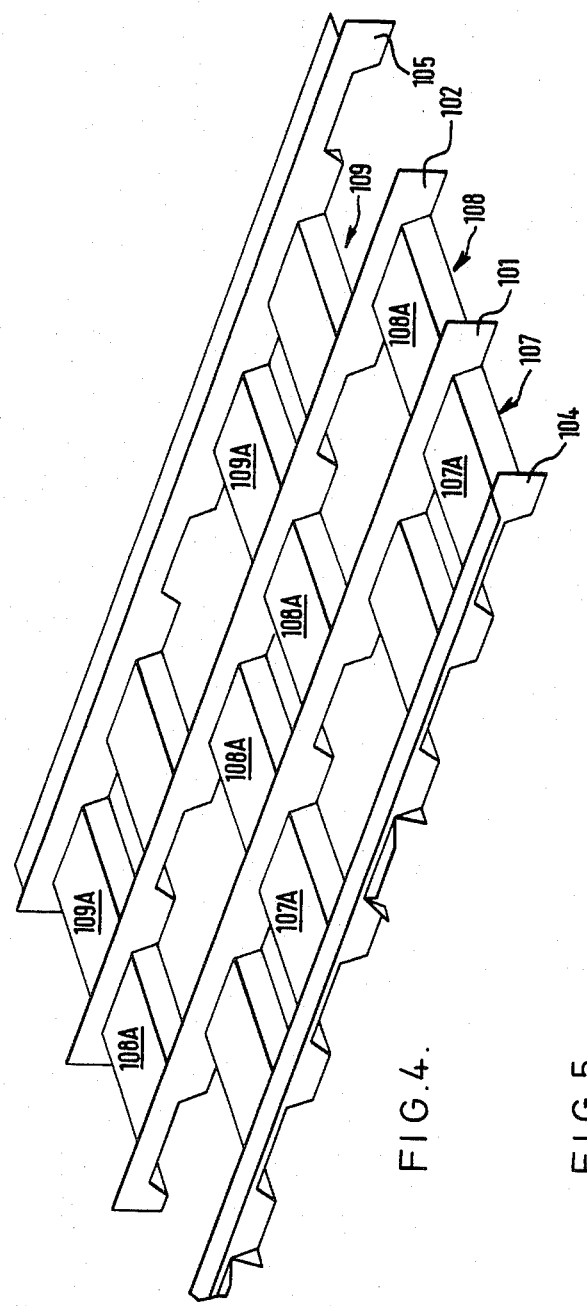
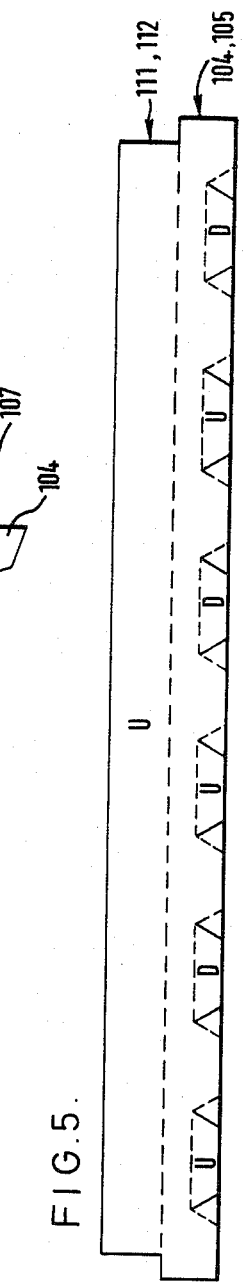
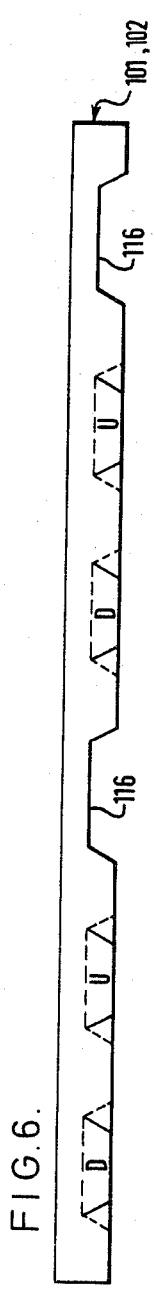
FIG. 4.
FIG. 5.
FIG. 6.

FLOORING SYSTEM WITH SERVICE TRUNKING PROVISION

The invention relates to services segregation apparatus in or for flooring systems.

So-called suspended floors of the pillar type readily afford extreme flexibility in arrangement of service feeds, including electrical cable, between support pillars at corners of rectangular floor panels laid over. Other added-on flooring systems, say using corrugated sheet material between the base to be floored and actual floor sheeting or boarding, have less flexibility, but more discipline in the sense that individual corrugation passageways can be dedicated to specific types of service and kept separated one from the other by sides of the passageways. However, such rigid discipline has disadvantage in relation to running services of any specific type from a dedicated channel to terminals spaced therefrom and/or to another dedicated channel. That disadvantage can be overcome by leaving gaps between ends of successive lengths of the corrugated sheeting, running transversely of the corrugations, i.e. spacing ends of sheets. However, there is then a lack of discipline in passageways afforded by the gaps, i.e. where more than one service is branched therethrough or where it is the main feedway for branching through to channels of the flanking sheeting.

It is an object of this invention to improve on this lack of discipline, basically by partitioning the passageways in gaps between ends of adjacent sets of sheeting and advantageously without the use of "cross-over" elements that would obstruct laying and relaying service feeds by requiring threading of same below cross-overs.

According to the invention, there is provided services segregation apparatus for flooring that employs corrugated sheeting, comprising an apertured divider to follow a gap through such sheeting transversely of its channels, and, associated with the divider, upwardly closed elements to each side thereof, those elements being of less height than said channels and the divider, and those elements each registering with a different aperture through the divider and with a different said channel, whereby service feeds passing over the elements on the direction of the divider and said gap can be segregated by the divider and also by the elements under which such service feed or feeds can be passed to the other side of the divider without crossover relative to other segregated service feed or feeds.

Preferred elements are staggered, essentially out-of-phase, inverted channels each registering with a different hole through the divider, and segregations of service feeds have a said divider or dividers between them and no access within each such segregation to any other segregated service feed type then covered by said inverted channel members, but access over such inverted channel members to other passageways in the main corrugated sheeting that are dedicated to the same service feed type.

For a binary segregation of service feeds, say with electric power wires/cables on the one hand and communications, etc. wire/cables on the other hand, a preferred modular divider system has inverted channel member communication at one side to similar alternate passageways of the main sheeting and at the other side to intervening also similar passageways of the main sheeting. Then, divider system modules each with communication to the same number of main sheeting passageways to each side of its divider can be standardised to the extent that either possible orientation of the modules is the same, thereby facilitating installation in an idiot-proof manner.

We further prefer that divider systems hereof have side members that also have communication holes or apertures to each main corrugated sheeting passageway and bent over top edge portions that can serve in engaging under cover panels. Where such side members and the divider have said inverted channel members connected securely between them a satisfactorily self-supporting and easily handled divider system, usually modules thereof fitting end-to-end, results. At least then, outwardly bent-over top edge margins of the side members can advantageously engage on and over webs of the main corrugated sheeting further to support cover panels.

Any central flexing of cover panels is conveniently limited by engagement on the top(s) of the divider(s) which are advantageously a small amount less high, say half a millimeter, than the side members/main sheeting.

Fabrication can be from suitable sheet metal blanks for the dividers, also said side members, from which spaced tab-like portions from the bottom edge are turned through 90° to create the holes, preferably tapered inwardly at their sides so that side nibs can also be bent through 90° in the same direction to engage, support and be secured to the inverted channel members. Side member blanks will normally also have their top edge margins bent through 90°.

Such bends of appropriate directions into the channel members conveniently provide non-sharp corners and enable pulling through of insulated wires and cables without chafing.

A particularly advantageous and simple embodiment hereof has inverted channel members each corresponding closely one-to-one with downwardly facing channels of the main corrugated sheeting, the whole divider system resembling alternate lower height continuations of such downwardly facing main sheeting channels in phase-opposition to each side of a substantially full-height central divider and between substantially full-height side members.

Practical implementation of this invention will now be specifically described, by way of example, with reference to the accompanying drawings, in which:

FIG. 2 is a perspective view of a detail portion of a flooring system utilising modules of FIG. 1;

FIG. 3 is a section through a portion of a flooring system,

FIG. 4 shows a rear-complete isometric view of a three-way segregation divider module; and FIGS. 5 and 6 show blanks for a side and a divider of the embodiment of FIG. 4.

Figure 1:
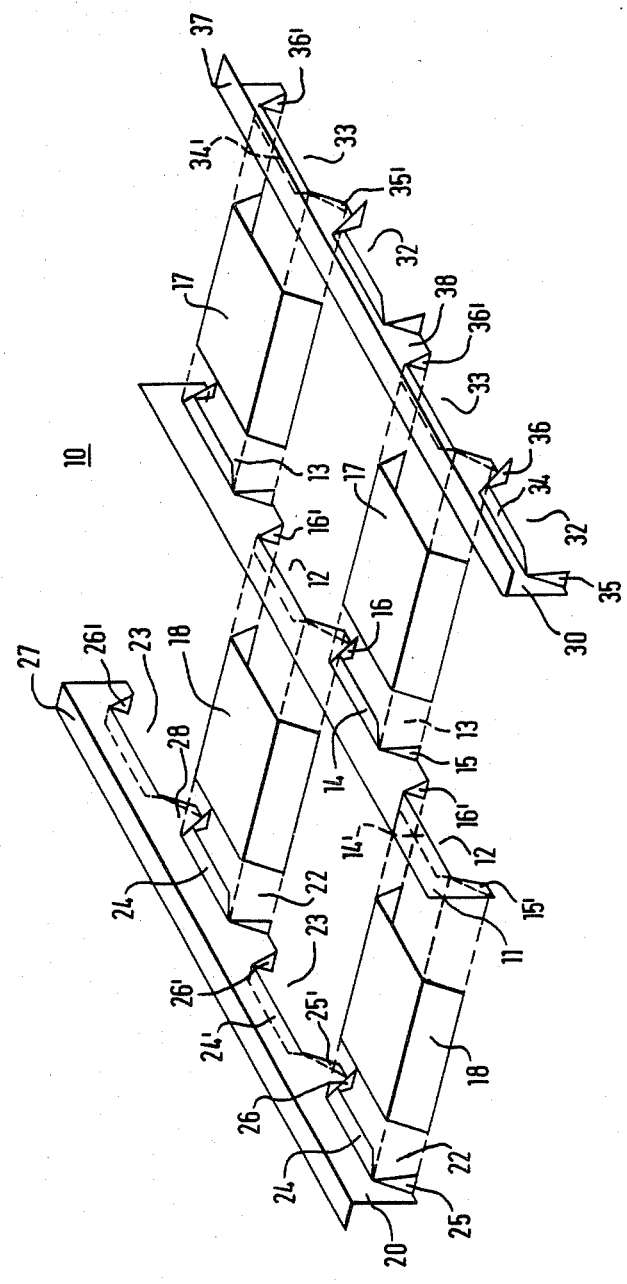
FIG. 1 is an exploded perspective view of a simple embodiment of divider module hereof of binary segregation.

In the drawings, referring first to FIG. 1, a divider system module 10 comprises a divider 11 that affords alternating spaced lower through-passages 12, 13 referred to above as holes. Such divider is shown as having been fabricated by bending a sheet metal blank so that alternate through-passages 13 have tab portions 14 bent out through 90° from the bottom edge of the divider and side nibs 15, 16 both also bent out through 90° in the same direction. The intervening through-passages 12 are similarly formed but with their tab and nib portions 14', 15', 16' bent out in the opposite direction.

Those bent-out tab portions and nibs are shown for fitting inside inverted channel members 17, 18 staggered out of phase to opposite sides of the divider 11. Preferably, and as shown, the bottom edges of the nibs are coplanar with the bottoms of the dividers, though that could be sacrificed for slope-sided inverted channel members to save waste on blanks for the dividers and side members.

The module 10 is further provided with side members 20 and 30 also having alternating lower through-passages 22, 23 and 32, 33 referred to above as holes and actually formed similarly to the through-passages in the divider 11, i.e. by bending out tab portions and side nibs from cuts from their bottom edges. As referenced, the through-passages 22 and 32 have bent out tab portions 24 and 34 and side nibs 25, 26 and 35, 36 and the through-passages are similarly formed by bending in the opposite direction, see 24', 25', 26' and 34', 35', 36'. In addition, the side members 20 and 30 have top edge (27 and 37) portions bent over outwards. The inverted channel members 18 interconnect through-passages 12 and 22 and the inverted channel members 17 interconnect through-passages 13 and 33, in each case forming protected tunnels. Secure connection of the inverted channel members to the side members and divider is readily achieved via the tab portions and side nibs of the through-passages, say by spot welding.

The side members 20, 30 are, in fact, of the same actual construction, being merely subject to an end— about 180° rotation relative to each other. Thus, effectively, the top bent-over part 27 and 37 correspond and so do the tab portions and side nibs 24, 25, 26, 24', 25', 26', and 34', 36', 35', 34, 36 35, respectively.

It is noted that, see also FIG. 2, the divider 11 ensures that supply feeds to each side thereof will be segregated into sets to each side thereof as they pass along over the inverted channel members 17 or those 18. Moreover, those segregated sets of feeds can pass, or be branched off, to either side into the tunnels, i.e. under the inverted channel members 17 or 18 to the other side, always in complete isolation one set from the other.

The sizes and shapes of the through-passages 22, 23, 32, 33 are advantageously in accordance with lower portions of profiles of main sheeting with which they are to be associated within a flooring system see FIG. 3 showing such main sheeting 40 emplaced upon a base floor level 41, usually concrete or concrete screeded, and subsequently clad with suitable panels 42, say of chip-board.

Ideally, as indicated in FIGS. 2 and 3, the side members have inner parts 28, 38 between their through-passages 22, 23, 32, 33 that block off normal upward-opening formations 43 of the main sheeting 40 between downward opening formations 44 thereof to lower parts of which the inverted channel members 17, 18 and the through-passages 22, 23, 32, 33 closely match. In any event the webs of the inverted channel members 17, 18 allow adequate freedom and space for feeds above and below, see FIG. 3.

Divider modules such as 10 assure binary segregation so that, see FIG. 2, alternate channels A of the main sheeting 40 serve for one segregated set 45X, 45Y, of feeds and intervening channels B serve for the other segregated set 46X, 46Y.

As shown in FIGS. 2 and 3, the divider system modules 10 can be used effectively across junctions 50 between main cladding sheets shown as overlapped between main inverted channel parts thereof. Then, the bent over top flanges 27, 37 will run continuously across such junctions 50 and be securable to four such joined sheets, two to each side. Clearly, the widths of the main sheets could be the same as the modules 10, or an integral multiple thereof, or some other relationship as the modules 10 do not have to be centralised relative to junctions 50 and are readily cut to smaller widths if desired or required.

Specific showing of binary segregation and strict alternation of segregated sets relative to main sheeting channels is not to be taken as limiting even though such allows provision of modules 10 that are the same for end-about 180° rotation, thus particularly facilitating installation without risk of mistakes. However, it is clearly not essential to have strict alternation, for example inverted channel members (say 17) to one side of the divider 11 could communicate with adjacent main sheeting channels, i.e. be central of the module 10 or to one end thereof, and inverted channel members (say 18) to the other side of the divider 11 could communicate with main sheeting channels separated by said adjacent ones, i.e. be at ends of the module 10 or the other end thereof. Then, main sheeting channels could be segregated in adjacent alternating pairs with modules 10 always laid with the same orientation. Moreover, less than all main sheeting channels could be utilised, say omitting one of the inverted channel members 17 and/or one of the inverted channel members 18 and corresponding through-communications through the divider and side members.

Clearly, divider system modules with more than one divider can provide two or more segregations, say with each adjacent set of three main sheeting channels effectively communicating with two aligned inverted channel members of the module but open only to one side of one of the dividers. FIGS. 4 to 6 show such a module.

In FIGS. 4 to 6, there are two dividers 101 and 102 between sides 104 and 105 with sets of inverted channel members 107, 108 and 109 between matching apertures therein. The sides 104, 105 have upper fixing flanges 111, 112.

The latter are conveniently bent over from blanks, see FIG. 5, which also shows cut (solid) and fold (dashed) lines for tabs to mate with channel members 107, 109 that terminate thereat and with main sheeting channels. Advantageously, for the particular module of FIG. 4, only one side blank is required, being turned end-about to serve the other side. As shown in FIG. 5, the letters U and D indicate turning up and down through 90° relative to the plane of the paper to make the side 104 directly (tabs D and corresponding side tabs going into channel members 107) and 105 when turned end-about (tabs D again going into channel members 109).

Some (subscripted A) of the channel members 107, 108 and 108, 109 are in register to each side of the dividers 101 and 102, respectively, and are then most conveniently formed as a single, double-length channel member element passing through cut-outs in the dividers, see 116 in the blank of FIG. 6. FIG. 6 also shows tab formations in similar manner to that of FIG. 5 and, again, advantageously, that blank will serve for both dividers 101, 102 by relative turning end-about. For divider 101, tabs (plus side tabs) marked U connect with short channel members 107 and tabs (plus side tabs) marked D connect with "long" channel members 108A, 109A. Similarly, for the divider 102, tabs U go into short channel members 109 and tabs D into "long" channel members 108A, 107A.

At least if some service feeds of the same type need or would benefit from mutual separation, the inverted channel members of divider system modules could themselves be partitioned along their lengths. It will be noted, of course that full isolation of this general nature for the main sheeting runs could be done using adjacent channels of the main sheeting and adjacent arrangements of inverted channel members.

Also, we point out that the inverted channel members could if desired, be provided as parts of continuous corrugated elements, say seam welded dividers/side members.

We claim:

1. In or for flooring that includes corrugated sheeting affording channels for services at spaced intervals via channels of its corrugation and presenting between ends of successive said sheeting a gap transverse to the directions of said channels, services segregation apparatus fitting into said gap and comprising an elongate divider having an upper edge and a lower edge and being apertured at spaced intervals along its length and below its upper edge; and, associated one with each aperture of the divider, a plurality of upwardly closed elements some extending from one side of the divider and others extending from the other side of the divider in each case to different selected said channels at said edges of said sheetings; the divider then defining paths to each side thereof and separated thereby for services to pass over the said elements at the same side of the divider and further providing access for such services only to the said elements at the other side of the divider via its said apertures and thence to said channels.

2. Apparatus according to claim 1 comprising at least two said dividers for at least threeway segregation.

3. Apparatus according to claim 1, comprising at least two said dividers for at least threeway segregation.

4. Apparatus according to claim 3, wherein the dividers have untabbed apertures for longer ones of the elements extending through the divider concerned.

5. Apparatus according to claim 1, wherein the elements are inverted channel members extending in the same direction as said channels.

6. Apparatus according to claim 5, wherein at least some of the members mate with tabs bent out of sheet material blanks for the divider.

7. Apparatus according to claim 5, wherein the members have a channel shape substantially matching lower parts of downwardly open said channels of said corrugated sheeting so that orientation of said apparatus in said gap is immaterial to segregation attainment.

8. Apparatus according to claim 7 wherein at least some of the members mate with tabs bent out of sheet material blanks for the divider.

9. Apparatus according to claim 8 wherein at least some of the members mate with tabs bent out of sheet material blanks for the sides.

10. Apparatus according to claim 1, comprising spaced sides apertured to communicate with said channels and otherwise close off said ends of the sheeting and to communicate selectively with said elements.

11. Apparatus according to claim 10, wherein at least some of the elements mate with tabs bent out of sheet material blanks for the sides.

12. Apparatus according to claim 11, wherein the sides have upper flanges bent over for fixing purposes.

13. Apparatus according to claim 12 wherein the same side blank serves for either side of the apparatus when turned end-about.

14. Apparatus according to claim 11, wherein the same side blank serves for either side of the apparatus when turned end-about.

15. Apparatus according to claim 10 wherein the elements are inverted channel members extending in the same direction as said channels.

16. Apparatus according to claim 15 wherein the members have a channel shape substantially matching downwardly open said channels of said corrugated sheeting so that orientation of said apparatus in said gap is immaterial to segregation attainment.

17. Apparatus according to claim 11 wherein at least some of the members mate with tabs bent out of sheet material blanks for the divider.

18. Apparatus according to claim 16 wherein at least some of the members mate with tabs bent out of sheet material blanks for the divider.

19. Apparatus according to claim 17 wherein at least some of the members mate with tabs bent out of sheet material blanks for the sides.

20. Apparatus according to claim 18 wherein at least some of the members mate with tabs bent out of sheet material blanks for the sides.

* * * * *